United States Patent [19]

Hoenigs et al.

[11] Patent Number: 4,589,172
[45] Date of Patent: May 20, 1986

[54] CENTRAL BELT LOCK, PARTICULARLY FOR A PARACHUTE HARNESS

[75] Inventors: Michael Hoenigs, Rödermark; Hermann Reuschenbach, Rossbach, both of Fed. Rep. of Germany

[73] Assignee: Autoflug GmbH, Rellingen, Fed. Rep. of Germany

[21] Appl. No.: 391,162

[22] PCT Filed: Oct. 24, 1981

[86] PCT No.: PCT/DE81/00179

§ 371 Date: May 20, 1983

§ 102(e) Date: May 20, 1983

[87] PCT Pub. No.: WO82/01529

PCT Pub. Date: May 13, 1982

[30] Foreign Application Priority Data

Oct. 24, 1980 [DE] Fed. Rep. of Germany ....... 3040134

[51] Int. Cl.$^4$ .............................................. A44B 11/26
[52] U.S. Cl. ........................................ 24/602; 24/603; 24/631; 24/639; 244/151 B; 280/801; 297/468
[58] Field of Search .......... 24/574, 602, 603, 630–633, 24/635–637, 639–641; 244/151 B; 280/801; 297/468, 485

[56] References Cited

U.S. PATENT DOCUMENTS

| | | | |
|---|---|---|---|
| 2,171,496 | 8/1939 | Waite et al. | 24/574 |
| 2,504,125 | 4/1950 | Hight | 24/632 X |
| 2,899,732 | 8/1959 | Cushman | 24/632 |
| 3,132,399 | 5/1964 | Cooper | 24/632 |
| 3,146,846 | 9/1964 | Gutshall | 24/603 X |
| 3,608,160 | 9/1971 | Coyle | 24/603 |
| 3,624,674 | 11/1971 | Gaylord | 24/603 |
| 3,744,102 | 7/1973 | Gaylord | 24/603 |
| 3,994,049 | 11/1976 | Johansen et al. | 24/603 X |
| 4,050,122 | 9/1977 | Turner et al. | 24/603 |
| 4,339,854 | 7/1982 | Ikesue | 24/639 X |

FOREIGN PATENT DOCUMENTS

| | | | |
|---|---|---|---|
| 1431203 | 11/1968 | Fed. Rep. of Germany | . |
| 2336147 | 7/1977 | France | 24/603 |
| 556006 | 9/1943 | United Kingdom | 244/151 B |
| 591641 | 8/1947 | United Kingdom | . |

Primary Examiner—William E. Lyddane
Assistant Examiner—James R. Brittain
Attorney, Agent, or Firm—Becker & Becker, Inc.

[57] ABSTRACT

A central belt lock, particularly for a parachute harness, includes a housing, a main pin or journal which is manually rotatable and axially movable therein, and an anchor plate which cooperates with a plurality of retaining bolts for the belt attachment or coupling members. There is dealt with the problem of allowing the belt attachment members to be released and thus disconnected from the lock even if the parachutist for some reason is unable to actuate the lock manually, after making a jump over the sea. Therefore, a central belt lock is provided to be activated by sea water and can be released thereby, without affecting the function thereof when operated manually. For this purpose, the main journal (2a) has at least one longitudinal bore in which a push rod (12) is mounted so as to be longitudinally movable. An actuator (20, 27) is associated with the push rod and is actuated when coming into contact with water, axially moving the push rod (12) and hence the anchor plate (5) with the retaining bolts (6). Preferably, the rotary handle (11a, 11b) of the belt lock contains an inner space (16) in which the actuator (20, 27) and the push rod as well as an angle lever serving as transfer members are accommodated.

10 Claims, 5 Drawing Figures

CENTRAL BELT LOCK, PARTICULARLY FOR A PARACHUTE HARNESS

BACKGROUND OF THE INVENTION

1. Field of the Invention

The invention relates to a locking device for a central strap, i.e. a central belt lock, particularly for a parachute harness, and comprises a housing, a main pin or journal which is manually rotatable and axially movable therein, and an anchor plate which cooperates with a plurality of retaining bolts for the belt attachment or coupling members. Central belt locks of this kind serve to release parachutists rapidly from their parachutes after landing, so that they are not dragged over the ground or through water if the wind drives the parachute along.

2. Description of the Prior Art

Central belt locks having the features recited are already known, for example from German Pat. Nos. 10 70 034, 12 05 321 and 20 43 634. In each case, the parachutist must actuate the belt lock himself by turning the main journal manually by means of a preferably disc-shaped handle, and pressing it axially into the release position, with the result that the retaining belts are pulled out of the eyelets in the belt attachment members, so that the body harness falls away from the person.

However, it may be that, as a result of shock, cold, or injury, the parachutist is not in a position to actuate his belt lock manually, an is consequently left in a largely helpless state in the harness. This is particularly dangerous if the parachutist has fallen into the sea, since he can then be dragged down by the parachute and drown before rescue arrives. To avoid this danger, it has already been proposed that the connecting member between the cords of the parachute and the shoulder straps of the harness be released automatically, when they are submerged under water, by using the higher conductivity of sea water effective via electrical or pyrotechnic means for such automatic release thereof. The disadvantage of this is that modifications of structure have to be made to the harness and to the means for connection with the cords of the parachute.

SUMMARY OF THE INVENTION

Proceeding on the basis of the foregoing prior art as known and described, an object of the present invention is to provide a central belt lock which contains an automatic release mechanism activated by sea water. The normal mechanical operation and manual actuation of the lock should not be restricted or limited, and the size of the lock should not be increased substantially. It is a further object that the mechanical securing normally provided should be able to be bridged by the automatic release mechanism in the secured position of the lock, but otherwise the same remains operational.

These objects are realized by a central belt lock which is characterized primarily in that the main journal has at least one longitudinal bore in which a push rod is mounted in such a way as to be longitudinally movable, and an actuator being associated with the push rod, being activated upon contact with water, and axially displacing the push rod and hence the anchor plate with the retaining bolts.

The push rod may be secured against rotation relative to the main journal, and at its end facing the anchor plate it may have a narrowed portion and a bar, which pass through an opening in the anchor plate.

The push rod may cooperate with a locking member which secures it against axial displacement and releases it when the actuator is activated.

The rotary handle of the belt lock may contain an inner space in which the actuator and transfer members or transmission means including a sliding contact and an angle lever are accommodated. The actuator may act on the push rod by means of the angle lever. Alternatively, the actuator may act on a liquid via a piston, and on the push rod via a second piston.

The actuator may comprise a pyrotechnic element, at least one mechanical spring, or a chamber filled with pressurized gas and a piston.

The actuation transfer or activating force output of the actuator may act on a sliding contact which is movably mounted at right-angles to the push rod and pushes against the angle lever by means of a projection or step. The sliding contact may have a lug which engages in a groove in the push rod, preventing the latter from moving axially.

The actuator may comprise two identical compression springs, mounted parallel to one another side by side, which act via a sliding contact on the angle lever, which axially displaces the push rod. The helical compression springs may rest on an angle portion on the housing of the rotary handle. The angle lever may be pivotably mounted on a bearing block which rests on the housing of the rotary handle.

Laterally of the push rod, there may be mounted a pivotable locking lever which in the locking position engages in a recess in the push rod and prevents the latter from moving longitudinally when the helical compression springs are clamped in place or tensioned. For pivoting the locking lever out of the locking position and into the release position, an electromagnet activated by a sensor coming into contact with sea water, may be provided.

One advantage of the invention is the fact that conventional central belt locks can still basically be used, and no modifications to the harness are necessary. This means that parachutists do not have to adapt to new handles which differ from the customary handles; this also contributes to the degree of safety in the lifesaving operation. The adaptation of locks already in use is readily possible with the invention. The production of new locks according to the invention requires only comparatively little additional expense, since the essential components are unchanged.

BRIEF DESCRIPTION OF THE DRAWINGS

The drawings show some embodiments of the invention which are described hereinafter. In the drawings.

DETAILED DESCRIPTION

Figure 1:
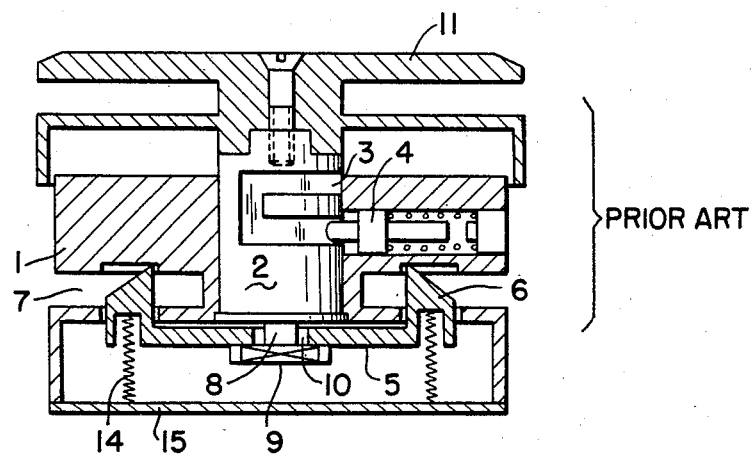
FIG. 1 is a diametric cross-sectional view taken through a conventional central belt lock for a parachute harness.

FIG. 1 shows the construction of a conventional central belt lock. A main journal, stud or pin 2 is mounted in a rotatable and axially movable manner in a housing 1. In a tangentially and axially extending groove 3 on the periphery of the main journal 2, there slides a spring-loaded locking pin 4, which, in conjunction with locking stages (not shown) in the groove 3, ensures that the main journal 2 can execute rotary and longitudinal movements only in certain directions, and engages in various positions provided for the functions of "applying or putting on", "secured" and "ejecting or taking off".

As a result of axial displacement of the main journal 2 in the downward direction in the "taking off" position, the lower end face of the main journal 2 presses against an anchor plate 5 on which a plurality of retaining bolts 6 are formed, so that these bolts are connected to one another via the anchor plate 5. The retaining bolts 6 project upwardly into slots 7 in the housing 1, and are able to engage with and hold the eyelets (not shown in FIG. 1) of the belt attachment members of the body harness. As a result of displacement counter to the force of compression springs 14, the retaining bolts 6 release the harness.

Fixedly connected to the main journal 2 via a narrowed portion 8 there is a bar 9 which passes through an oblong opening 10 in the anchor plate 5 and prevents the anchor plate 5 from being accidentially moved. Only in the "putting on" position does the bar 9 take up a position relative to the opening 10 such that the anchor plate 5, and hence also the retaining bolts 6, on being inserted into the eyelets of the belt attachment members, can move downwards.

The movements of the main journal 2 are effected manually by means of a disc-shaped rotary handle 11. The above-mentioned functions of the lock are engraved on the rotary handle.

Figure 2:
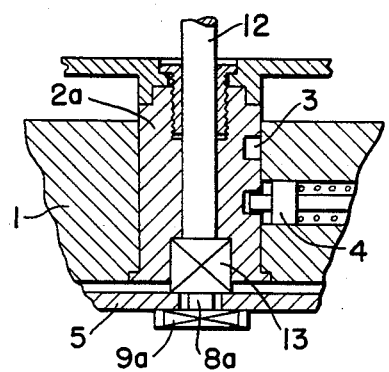
FIG. 2 is a fragmentary diametric cross-sectional view taken through a central belt lock having features according to the present invention includes a main journal having an axial bore and a push rod mounted therein.

FIG. 2 shows, according to the invention, a main journal 2a and a push rod 12 which is mounted so as to be axially movable therein, and is secured against rotation by a planar surface 13 in a suitable recess in the main journal 2a. At the lower end of the push rod 12 there are provided a narrowed portion 8a and a bar 9a, the shapes of which are similar to the embodiment shown in FIG. 1, except that the narrowed portion and the bar are fixedly connected to the push rod 12, and not to the main journal 2. As a result, the normal course of operation is unchanged, if the lock is released manually, as described with reference to FIG. 1. However, independently of this, the push rod 12 may be pushed downwards by means of suitable means in the main journal 2, and thus can move the retaining bolts 6 out of the slots 7 without moving the main journal 2 in the rotary or longitudinal direction. In this way, the belt attachment members can be released automatically.

The entire lower part of a conventional central belt lock as shown in FIG. 1, namely the housing 1, anchor plate 5 with retaining bolts 6, compression springs 14 and cover 15, can be adapted or taken over for the structure of the lock shown in FIG. 2. The main journal 2 may also be re-used, after being suitably reworked.

In the exemplary embodiments, in the rotary handle 11 of the belt lock, there is provided an inner space 16 enclosed by a handle housing 11a and a handle cover 11b. The base plate 17 of the rotary handle 11a, 11b is fixed to the main journal 2a by means of a hollow screw 18, and is positively secured against rotation by means of a recessed planar surface 19. The inner space 16 in the rotary handle may accommodate suitable sensors, the actuator for actuating the push rod 12, and mechanical transfer members or transmission means from the actuator to the push rod 12.

Figure 3:
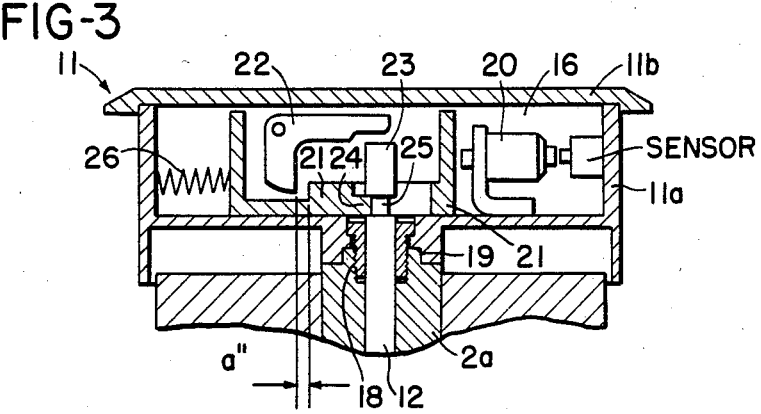
FIG. 3 shows the upper fragmentary diametric cross-sectional view taken through a lock according to the present invention having a rotary handle mounted above the housing and main journal, inside which are accommodated the components for releasing the lock under the effect of sea water.

The actuator in the embodiment of FIG. 3 is a sensor means or pyrotechnic element 20 which acts on the end face 23 of the push rod 12 via a sliding contact 21 and an angle lever 22; the sliding contact 21 and the angle lever 22 are effective as the transfer members for the force of the pyrotechnic element 20. When coming into contact with water, the sensor means or pyrotechnic element 20 is ignited by a suitable electric circuit, so that its force of ejection moves the push rod 12 downwards via the sliding contact 21 and the angle lever 22, and in this way opens the lock and releases the attachment members of the harness. This may happen within a fraction of a second.

Also mounted on the sliding contact 21 is a lug 24 which engages in a groove 25 in the push rod 12 and prevents the latter from moving axially. When the pyrotechnic element 20 is ignited, the sliding contact 21 first has to travel a distance "a" before the push rod 12 is released. For this purpose, a corresponding amount of play is provided on the angle lever 22. A compression spring 26 secures the sliding contact 21 against accidental displacement.

Figure 4:
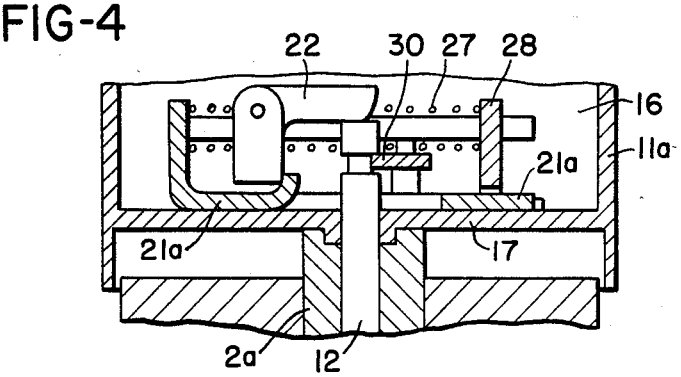
FIG. 4 is a cross-sectional view similar to FIG. 3, but wherein a different actuator is provided for acting on the push rod.
Figure 5:
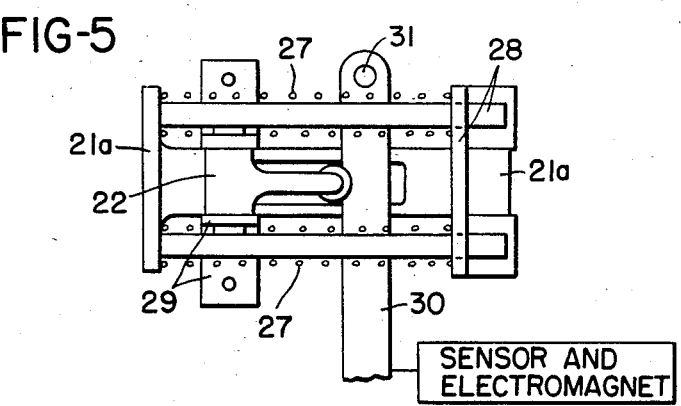
FIG. 5 is a plan or top view of the release mechanism shown in FIG. 4.

FIGS. 4 and 5 show a further exemplary embodiment, namely a central belt lock with a mechanical actuator comprising two helical compression springs 27 which act on the push rod 12 via a sliding contact 21a and the angle lever 22. At the other end, the helical springs 27 rest on the housing 11a, 17 of the rotary handle 11 via an angle portion or flange means 28. The angle lever 22 is rotatably mounted on a bearing block 29 (FIG. 5). A locking lever 30, which engages in a corresponding recess in the push rod 12, locks the push rod 12 in the tensioned position of the actuator, which takes the form of the helical springs 27. If the locking lever 30 is pivoted about its center of rotation 31, for example by means of an electromagnet (not shown), it releases the push rod 12, so that the latter is pushed downwards by the compression springs 27 by means of the angle lever 22.

A further embodiment, not shown in the drawings, provides that the actuator is a chamber filled with pressurized gas, the pressure of which is transmitted to the push rod 12 via a piston. Finally, the force of any desired actuator may be transmitted to a liquid via a piston, and may then be deflected onto the push rod 12 by means of an additional piston.

The central belt locks constructed according to the present invention may make a substantial contribution to ensuring that parachutists equipped with them have a comparatively greatly increased chance of survival if they have to jump over the sea. This is particularly important for military use, and in organizations for rescuing shipwreck victims, since the missions flown are usually or always over the sea. The results or advantageous effects of the invention described above are attained with comparatively limited equipment, and at correspondingly low cost. Moreover, existing belt locks of conventional construction can be modified.

The features of the object of the application disclosed in the description, drawings, and claims may be essential to the various embodiments of the invention both individually and in any desired combination with one another.

We claim:

1. A central belt lock, especially for parachutists-body-belts, comprising:
    a housing having an inside surface;
    a main journal which is manually rotatable and axially movable in said housing, said main journal being provided with at least one longitudinal bore;
    an anchor plate operatively connected with said housing and arranged with a plurality of retaining bolts for belt attachment members;
    a push rod operatively connected with said anchor plate and mounted in each longitudinal bore of said main journal, so that said push rod is longitudinally movable;
    an actuator operatively connected with said push rod, said actuator including a sensor means operatively triggered upon contact with water for axial displacement of said push rod and hence of said anchor plate with said retaining bolts;
    a rotary handle provided with said main journal for effecting manual rotation and axial movement, said rotary handle including an inner space which accommodates said actuator and transfer members for transferring movement from said actuator to said push rod;
    said transfer members including an angle lever having operative pivotal mounting relative to said housing and via which said actuator acts on said push rod; and
    a sliding contact which is mounted and arranged to be movable at right angles to said push rod; said sliding contact with said angle lever comprising said transfer members, said sliding contact being provided with a projection, with the movement of said actuator acting on said sliding contact for sliding movement of the sliding contact upon the inside surface of the housing so as to provide operative connection effective in pushing said projection thereof against said angle lever.

2. A central belt lock according to claim 1, in which said push rod is provided with a groove, and said sliding contact is provided with a lug for engaging said groove and preventing axial movement of said push rod.

3. A central belt lock according to claim 1, in which said rotary handle includes a handle housing; and which includes a bearing block arranged on said handle housing and securely connected therewith, said angle lever being pivotably mounted on said bearing block.

4. A central belt lock according to claim 1, in which said anchor plate is provided with an opening; said push rod including anti-rotation means so that said push rod is kept from any rotation relative to said main journal; said push rod having a first end remote from said anchor plate, and a second end facing said anchor plate and extending through said opening; and said second end of said push rod being provided with a narrowed portion and a bar which via said opening in said anchor plate cooperate to prevent said anchor plate from being accidentally moved.

5. A central belt lock according to claim 4, which includes a locking member connected with said housing and with said push rod for securing said push rod against axial displacement and for releasing said push rod when said actuator is activated.

6. A central belt lock according to claim 1, in which said actuator includes a pyrotechnic element.

7. A central belt lock according to claim 1, in which said actuator includes two helical compression springs having parallel relationship to one another; and including ends thereof that act on said angle lever for axially displacing said push rod.

8. A central belt lock according to claim 7, in which said rotary handle includes a handle housing which is provided with a flange means; and in which said compression springs engage said flange means.

9. A central belt lock according to claim 7, in which said push rod is provided with a recess, and which includes a locking lever pivotably mounted in said housing and located laterally of said push rod, said locking lever, in the locking position, engaging said recess of said push rod to prevent the latter from moving longitudinally when said one of said compression springs is tensioned.

10. A central belt lock according to claim 9, said actuator includes an electromagnet placed therewith and actuated by a water-sensitive sensor for pivoting said locking lever out of the locking position and into a release position.

* * * * *